March 18, 1930.

A. E. ANDERSON 1,751,380

SYSTEM OF ELECTRIC DISTRIBUTION

Filed May 25, 1929

Inventor:
Arvid E. Anderson,
by Charles E. Mullan
His Attorney.

Patented Mar. 18, 1930

1,751,380

UNITED STATES PATENT OFFICE

ARVID E. ANDERSON, OF LANSDOWNE, PENNSYLVANIA, ASSIGNOR TO GENERAL ELECTRIC COMPANY, A CORPORATION OF NEW YORK

SYSTEM OF ELECTRIC DISTRIBUTION

Application filed May 25, 1929. Serial No. 366,030.

My invention relates to systems of electric distribution and particularly to a system of the type covered by Letters Patent 1,669,097, assigned to the assignee of the present application. In the system of distribution covered by said Letters Patent a source of current supplies current to an electric circuit comprising a plurality of sections connected in series by a plurality of sectionalizing switches, means are provided for disconnecting a faulty section by effecting the opening of the sectionalizing switch nearest to and on the source side of a fault without effecting the opening of any of the other sectionalizing switches between the fault and the source. One object of my invention is to provide an improved arrangement for selectively controlling the opening and reclosing of the sectionalizing switches in a system of the type shown in said Letters Patent.

My invention will be better understood from the following description, when taken in connection with the accompanying drawing and its scope will be pointed out in the appended claims.

Figure 1:
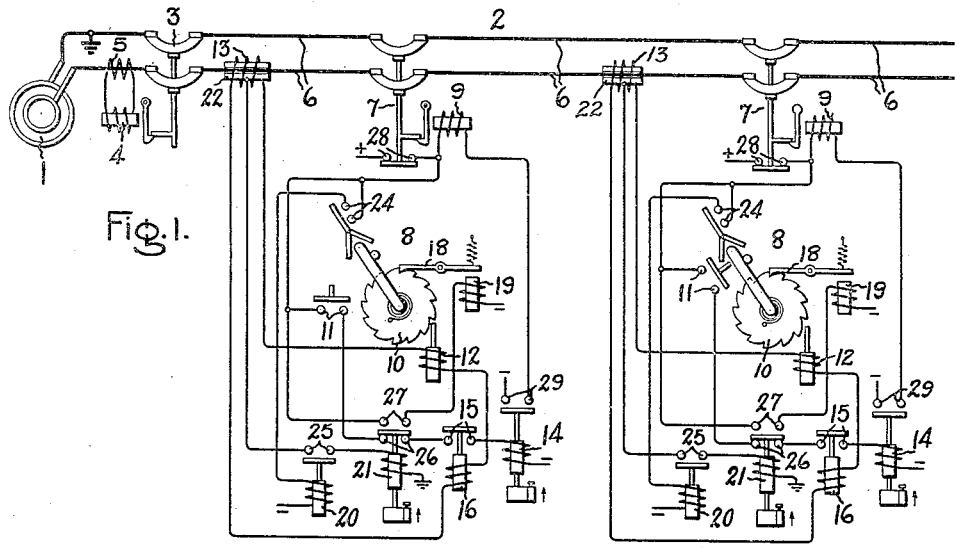
Figure 2:
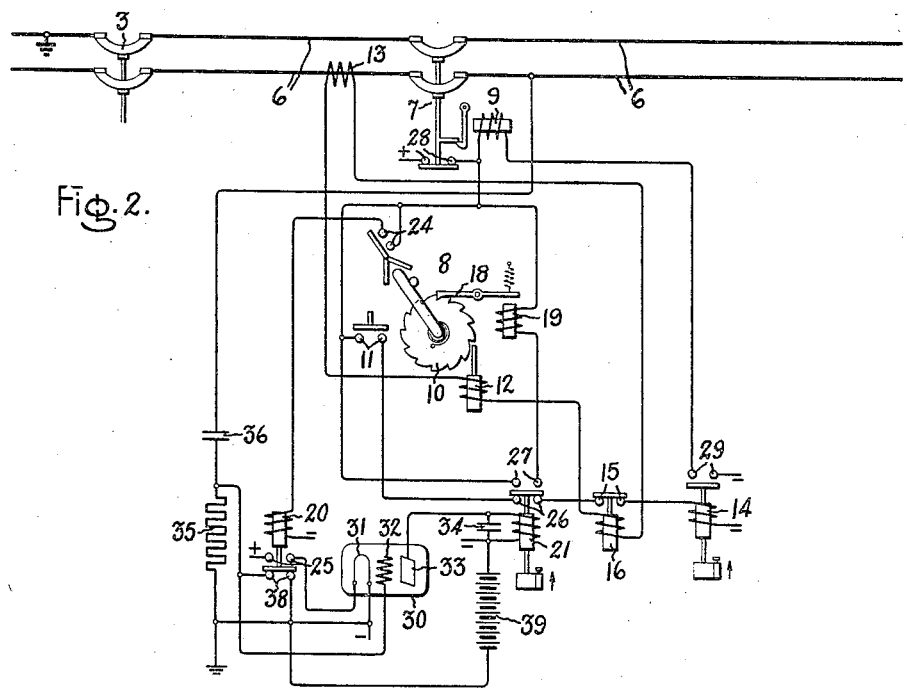

In the accompanying drawing, Fig. 1 is a diagrammatic showing of a system of electric distribution embodying my invention and Fig. 2 is a diagrammatic showing of a modification of my invention.

Referring to Fig. 1, which shows diagrammatically a system of electric distribution, a source of current 1 is arranged to be connected to an electric circuit 2 by means of a suitable overload circuit breaker 3. As shown the circuit breaker 3 is of the latched-in type and is provided with a trip coil 4 which is connected in any suitable manner, as by means of a current transformer 5, so that it is energized in response to the current through the circuit breaker 3. The trip coil 4 is arranged so that it effects the opening of the circuit breaker 3 in response to predetermined abnormal current conditions on the circuit 2. The closing of the circuit breaker 3 may be effected in any suitable manner.

The circuit 2 comprises a plurality of sections 6 which are connected in series by suitable sectionalizing switches 7. Each switch 7 has suitable control means 8 associated therewith and embodying my invention for controlling the opening thereof so that the first switch 7 to be opened between the overload circuit breaker 3 and a fault on any section 6 is the switch 7 nearest to and on the source side of the fault.

In the embodiment of my invention shown in Fig. 1, each switch 7 includes a trip coil 9 which, when energized, effects the opening of the switch. Each trip coil 9 is arranged to be energized, in response to the associated control means 8, after the current through the associated switch 7 has exceeded a predetermined value a predetermined number of times, the number of times required to effect the opening of a switch varying inversely with the distance of the switch from the circuit breaker 3. For example, in the arrangement shown in the drawing in which only two switches 7 are shown, the control means 8 may be arranged so that the right hand switch 7 which is further from the circuit breaker 3 than the other switch 7, is opened after the current through the switch has exceeded a predetermined value only once, whereas the other switch 7, nearer the circuit breaker 3, is opened only after the current through the switch has exceeded the predetermined value twice.

This selective action of the control means 8 is obtained in the drawing by providing each control means 8 with a suitable notching device 10 which is actuated each time the current through the associated switch 7 exceeds a predetermined value, and arranging the devices 10 so that they close their respective contacts 11 after the associated actuating coils 12 have been energized different numbers of times.

As shown, the actuating coils 12 are supplied from suitable current transformers 13, the primary windings of which are connected in series with the circuit 2 adjacent to the associated switch 7. The contacts 11 of each notching device 10 are in a circuit of an associated control device 14 which controls the circuit of the trip coil 9 of the associated switch 7. In order that a switch 7 may be opened only when there is no current flowing through it, the energizing circuit of each control relay 14 also includes contacts 15 of a current relay 16 which is connected to the associated current transformer 13 so that the contacts 15 are open whenever current flows through the associated switch 7. Therefore, a switch 7 can be opened only after the current through the switch has subsequently decreased below a predetermined value, after the current has exceeded the predetermined value a sufficient number of times to close the contacts 11 of the associated switching device 8.

It will be observed that whenever a fault occurs on any section, the actuating coils of all of the notching devices between the source and the faulty section are simultaneously energized each time the circuit breaker 3 is reclosed and an abnormal current flows through the circuit 6. Therefore, after the notching device of the switch 7 adjacent to the faulty section has been actuated a sufficient number of times to effect the disconnection of the faulty section from the circuit or the fault is removed before the faulty section is cut out, it is desirable to have all of the notching devices 10 automatically return to their normal positions. In accordance with my invention, I accomplish this result by providing each notching device 10 with a suitable holding means, shown as a pawl 18 which is arranged to hold the device in its actuated position after each operation of the associated actuating means 12. Each holding pawl 18 is arranged to be released by an electromagnet 19 when the adjacent section 6 nearer the source is energized a predetermined length of time after the associated notching device 10 has been moved out of its normal position. As shown in the drawing, this result is obtained by arranging each notching device 10 so that when it is out of its normal position it completes a circuit for an associated control relay 20, which in turn renders an associated voltage relay 21 operative to effect the energization of the associated release coil 19 when the adjacent section remains energized for a predetermined time.

In order to decrease the cost of the control equipment, when used with high voltage systems, it is desirable to eliminate the use of voltage transformers of the ordinary type. In the arrangement shown in the drawing, I accomplish this result by employing a modified current transformer 13 in which a metallic plate 22 is inserted between the primary and secondary windings of the current transformer and connecting the voltage relay 21 between the plate 22 and the other side of the circuit 2. The plate 22, therefore, acts as a capacity coupling between the relay 21 and the circuit 6.

The operation of the arrangement shown in Fig. 1 is as follows: Let it be assumed that the various devices are in the positions shown and a fault occurs on the end section 6 of the circuit 2 so that sufficient current flows to operate the trip coil 4 and thereby effect the opening of the circuit breaker 3. The abnormal current also effects the operation of each actuating magnet 12 so that each notching device 10 is advanced one notch and closes its contacts 24 to effect the energization of the associated control relay 20, which by closing its contacts 25 renders the associated voltage relay 21 operative to control the resetting of the associated notching device 10. Since the time setting of the relays 21 is relatively long with respect to the time of operation of the trip coil 4, the relays 21 are not energized for a sufficient length of time to open their respective contacts 26 and close their respective contacts 27 before the circuit breaker 3 opens.

Although all of the devices 10 are advanced one notch, only the device 10 associated with the right hand switch 7, in the drawing, closes its contacts 11. After the circuit breaker 3 opens and interrupts the supply of current to the load circuit 2, all of the undercurrent relays 16 close their respective contacts 15. Since the contacts 11 of the right hand switch 7 are closed, the closing of the contacts 15 of the associated undercurrent relay 16 completes, through contacts 28 of the switch 7, contact 11 of the notching device 10 and contacts 26 of the associated relay 21, an energizing circuit for the control relay 14, which by closing its contact 29 completes a circuit for the trip coil 9 of the switch 7 to effect the disconnection of the faulty section 6 from the circuit 2. Therefore, when the circuit breaker 3 is reclosed, service is restored to the portion of the circuit 2 which is in sound condition. The closing of the circuit breaker 3 restores normal voltage across each of the normal sections so that the respective voltage responsive relay 21 which is energized therefrom, operates to close its respective contacts 27 and thereby completes the circuit of the release magnet 19 of the respective notching device 10 so that the notching device 10 and contacts 24 are restored to their normal position.

If the fault occurs on the middle section 6 shown in the drawing, the first reclosure of the circuit breaker 3 would reconnect the abnormal condition to the source, unless the fault had been removed in the meantime. Therefore, upon the first reclosure of the circuit breaker 3 the cycle of operation above described is repeated and the notching device 10 associated with switch 7 nearer the circuit breaker 3 is advanced a second notch so that it closes its contacts 11. Consequently, after the second opening of the circuit breaker 3, the switch 7 nearer the source 1 is opened, so that when the circuit breaker 3 is reclosed the second time service is restored to the normal section 6 adjacent to the circuit breaker 3.

The modification shown in Fig. 2 is similar to the embodiment shown in Fig. 7 except that a different voltage responsive arrangement is employed. The relay 20 instead of directly controlling the circuit of the voltage relay 21 controls the operation of a suitable electron discharge device 30, the output of which is controlled in response to the voltage of the adjacent section 6 which is not between the associated switch 7 and circuit breaker 3. As shown, the device 30 includes a cathode 31, grid 32 and plate 33. The relay 20, when energized completes the heating circuit of the cathode 31 of the tube 30. The relay 21 and a suitable source such as a battery 39 are connected in series in the plate circuit of the electron discharge device 30. Preferably a discharge condenser 34 is connected in parallel with the relay 21. In order to control the output of the discharge device 30 in response to the voltage of the adjacent section 6, the cathode 31 and grid 32 are connected to a resistor 35 which is connected in series with a coupling condenser 36 across the section 6 so that the current through the discharge device 30 varies with section voltage. In order to decrease the relative voltage on the grid 32 when the device 30 is not in operation, the contacts 38 of associated relay 20 when deenergized, are arranged to connect the cathode 31 and grid 32 together so that they are both at the same potential. The operation of the modification shown in Fig. 2 is the same as the arrangement shown in Fig. 1 except that due to the change in the connections of the voltage responsive means the notching device associated with an open switch 7 is not reset in response to the energization of the adjacent section 6 nearer the source.

While I have in accordance with the patent statutes, shown and described my invention as applied to a particular system and as embodying various devices diagrammatically indicated, changes and modifications will be obvious to those skilled in the art and I, therefore, aim in the appended claims to cover all such changes and modifications as fall within the true spirit and scope of my invention.

What I claim as new and desire to secure by Letters Patent of the United States, is:

1. In combination, an electric circuit including a plurality of sections connected in series by sectionalizing switches, a source of current connected to one end of said circuit, means associated with each switch for effecting the opening thereof including a device responsive to a predetermined abnormal circuit condition, said devices being arranged so that the number of operations thereof required to effect the opening of the respective switches varies inversely with the distance of the respective switches from the source, and means associated with each device and responsive to a predetermined electric condition of the circuit for resetting the device when said predetermined electric condition lasts for a predetermined time.

2. In combination, an electric circuit including a plurality of sections connected in series by sectionalizing switches, a source of current connected to one end of said circuit, means associated with each switch for effecting the opening thereof including a device responsive to a predetermined abnormal circuit condition, said devices being arranged so that the number of operations thereof required to effect the opening of the respective switches varies inversely with the distance of the respective switches from the source, and means associated with each device and responsive to the voltage across an adjacent section for resetting the associated device when the voltage across said adjacent section remains above a predetermined value for a predetermined time.

3. In combination, an electric circuit including a plurality of sections connected in series by sectionalizing switches, a source of current connected to one end of said circuit, means associated with each switch for effecting the opening thereof including a device having an operating winding responsive to the current through the respective switch and a release coil, said devices being arranged so that the number of energizations of the respective operating windings required to effect the opening of the respective switches varies inversely with the distance of the respective switches from the source, and means associated with each switch and responsive to the energization of an adjacent section for a predetermined time for effecting the energization of the respective release coil.

4. In combination, an electric circuit including a plurality of sections connected in series by sectionalizing switches, a source of current connected to one end of said circuit, means associated with each switch for effecting the opening thereof including a device responsive to a predetermined abnormal circuit condition, said devices being arranged so that the number of operations thereof required to effect the opening of the respective switches varies inversely with the distance of the respective switches from the source, and means associated with each device and responsive to an electric condition of said circuit for preventing each device from effecting the opening of its respective switch while the circuit is energized and for effecting the resetting of a device when the circuit is energized for a predetermined time.

5. In combination, an electric circuit including a plurality of sections connected in series by sectionalizing switches, a source of current connected to one end of said circuit, means associated with each switch for effecting the opening thereof including a device responsive to a predetermined abnormal circuit condition, said devices being arranged so that the number of operations thereof required to effect the opening of the respective switches varies inversely with the distance of the respective switches from the source, means associated with each device and responsive to the current through the associated switch for preventing a device from effecting the opening of its associated switch while the current therethrough is above a predetermined value, and means for effecting the resetting of a device when the voltage of the adjacent section remains above a predetermined value for a predetermined time.

6. In combination, an electric circuit including a plurality of sections connected in series by sectionalizing switches, a source of current connected to one end of said circuit, means associated with each switch for effecting the opening thereof including a device responsive to a predetermined abnormal circuit condition, said devices being arranged so that the number of operations thereof required to effect the opening of the respective switches varies inversely with the distance of the respective switches from the source, and means for resetting each device in response to the voltage of an adjacent section including a voltage relay and a capacity coupling between the relay and the adjacent section.

7. In combination, an electric circuit including a plurality of sections connected in series by sectionalizing switches, a source of current connected to one end of said circuit, means associated with each switch for effecting the opening thereof including a device responsive to a predetermined abnormal circuit condition, said devices being arranged so that the number of operations thereof required to effect the opening of the respective switches varies inversely with the distance of the respective switches from the source, and means for resetting a device in response to the voltage of an adjacent section including an electron discharge device, and means for controlling the output of said device in response to the voltage of the adjacent section.

In witness whereof, I have hereunto set my hand this 22nd day of May, 1929.

ARVID E. ANDERSON.